United States Patent
Dzenis et al.

(10) Patent No.: US 6,265,333 B1
(45) Date of Patent: *Jul. 24, 2001

(54) DELAMINATION RESISTANT COMPOSITES PREPARED BY SMALL DIAMETER FIBER REINFORCEMENT AT PLY INTERFACES

(75) Inventors: Yuris A. Dzenis, Lincoln, NE (US); Darrell H. Reneker, Akron, OH (US)

(73) Assignee: Board of Regents, University of Nebraska-Lincoln, Lincoln, NE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/201,935

(22) Filed: Dec. 1, 1998

Related U.S. Application Data (60) Provisional application No. 60/087,694, filed on Jun. 2, 1998.

(51) Int. Cl.⁷ .................................................. B32B 27/12
(52) U.S. Cl. ..................... 442/346; 442/381; 442/392; 428/300.7; 428/903; 156/276
(58) Field of Search ............... 428/300.7, 297.4, 428/298.1, 903; 156/276; 442/346, 381, 392

(56) References Cited

U.S. PATENT DOCUMENTS

| | | | |
|---|---|---|---|
| 4,241,129 | 12/1980 | Marton et al. | 428/216 |
| 4,624,886 | 11/1986 | Cogswell et al. | 428/245 |
| 4,735,828 | 4/1988 | Cogswell et al. | 427/359 |
| 4,786,343 | 11/1988 | Hertzberg | 156/93 |
| 4,868,038 | 9/1989 | McCullough et al. | 428/222 |
| 4,957,801 | 9/1990 | Maranci et al. | 428/147 |
| 4,966,802 | 10/1990 | Hertzberg | 428/119 |
| 5,057,353 | 10/1991 | Maranci et al. | 428/147 |
| 5,143,569 | 9/1992 | Gotoh et al. | 156/148 |
| 5,240,533 | 8/1993 | Böttger et al. | 156/148 |
| 5,271,982 | 12/1993 | Verpoest et al. | 428/86 |
| 5,350,614 | 9/1994 | Chase et al. | 428/53 |
| 5,630,897 | 5/1997 | Branca et al. | 156/148 |
| 5,641,366 * | 6/1997 | Hohman | 428/300.7 |
| 5,783,279 | 7/1998 | Edgson et al. | 428/116 |

OTHER PUBLICATIONS

Masters, J.E., "Improved Impact and Delamination Resistance Through Interleafing," *Key Engineering Materials*, vol. 37, pp. 317–348 (1989).

Garg, A.C., "Delamination—A Damage Mode in Composite Structures," *Engineering Fracture Mechanics*, vol. 29, pp. 557–584 (1986).

Chan, W.S., "Design Approaches for Edge Delamination Resistance in Laminated Composites," *Journal of Composites Technology and Research*, vol. 14, pp. 91–96 (1991).

Chan, W.S. and Ochoa, O.O., "Edge Delamination Resistance by a Critical Ply Termination," *Key Engineering Materials*, vol. 37, pp. 285–293 (1989).

(List continued on next page.)

*Primary Examiner*—Elizabeth M. Cole
(74) *Attorney, Agent, or Firm*—Suiter & Associates PC; Scott C. Rand; William J. Breen, III

(57) ABSTRACT

A fiber reinforced composite material comprising a resin matrix and primary reinforcement fibers and further comprising secondary, smaller diameter, reinforcement fibers at one or more ply interfaces, or portion thereof, provides improved interlaminar toughness, strength, and delamination resistance without substantial reduction of in-plane properties and without substantial increase in weight. In one embodiment, the small fibers are attached to one side of a conventional prepreg prior to lamination. The small fibers are flexible and are expected to conform to the shape and distribution of the primary reinforcing fibers at the interface.

49 Claims, 9 Drawing Sheets

OTHER PUBLICATIONS

Browning, C.E., and Schwartz, H.S., "Delamination Resistance Composite Concepts," *Composite Materials: Testing and Design,* J.M. Whitney, Ed., ASTM STP 893, American Society for Testing and Materials, Philadelphia, pp. 256–265 (1986).

Carisson, L.A. and Pipes, R.B., "Characterization of Interlaminar Fracture," in Experimental Characterization of Advanced Composite Materials (Prentice–Hall: Englewood Cliffs, NJ) pp. 157–193 (1987).

Wente, "Superfine Thermoplastic Fibers," *Industrial and Engineering Chemistry,* vol. 42, No. 8, pp. 1342—46 (1956).

Reneker et al., "Nanometre diameter fibres of polymer, produced by electrospinning," *Nanotechnology,* vol. 7, pp. 216–223 (1996).

Reneker, "Nanofibers for Engineered Textiles," UMIST— *Textiles Engineered for Performance,* Apr. 20–22, 1998.

Dzenis et al., "Novel Laminated Composites with Nanoreinforced Interfaces," ECCM–8, pp. 518–524, European Conference of Composite Materials, Jun. 3–6, 1998.

\* cited by examiner

DELAMINATION RESISTANT COMPOSITES PREPARED BY SMALL DIAMETER FIBER REINFORCEMENT AT PLY INTERFACES

CROSS-REFERENCE TO RELATED APPLICATIONS

This application claims priority under 35 U.S.C. §119(e) to U.S. provisional application Ser. No. 60/087,694, filed Jun. 2, 1998. Said provisional application Ser. No. 60/087,694 is incorporated herein by reference in its entirety.

FIELD OF THE INVENTION

The present invention relates generally to the reinforcement of adhesive interfaces and, more particularly, to the use of small fibers to provide low volume, high strength reinforcement of interfaces between the plies of a laminate material.

BACKGROUND OF THE INVENTION

Fiber reinforced composites comprise a fibrous or filamentary material embedded in a matrix. The fiber is the load bearing component and the matrix dissipates loads to the fibers, maintains fiber orientation, and protects the fiber from damaging environmental conditions.

Composites are classified according to their matrix phase. For example, there are polymer matrix composites (PMCs), ceramic matrix composites (CMCs), and metal matrix composites (MMCs). Other types of composites are also known, such as glass matrix composites, carbon matrix composites, etc.

Polymer matrix composites utilize a resin system along with a catalyst or curing agent and fiber reinforcement. These materials are used in consumer goods such as boats, piping, auto bodies, etc., as well as in the production of a wide spectrum of industrial components.

High strength, high modulus composite materials are often termed "advanced composites." Low weight, high strength, high stiffness materials are especially attractive for aircraft and aerospace structural components. Advanced composites have also been adopted for use in the manufacture of sporting goods such as high performance golf, tennis, fishing, and archery equipment. Advanced composites are also finding increased use in the industrial and automotive markets, as well as for other weight sensitive applications.

Fiber reinforced resin composites are typically formed by laying up a plurality of plies formed of reinforcing fibers. The plies may be preimpregnated with resin in an uncured or partially cured state. The resin is cured by applying heat and usually pressure, although catalytic curing at low temperature is also known, e.g., curing at room temperature using a catalyst-promoter system. Alternatively, resin layers may be added to stacks of dry plies and the resin infused into the dry plies as it is cured.

Due to the ply-by-ply nature of resin composites, the susceptibility to delamination along interlaminar planes is an intrinsic and severe problem of these materials [1]. Interlaminar stresses due to mismatch of anisotropic mechanical and thermal properties of plies occur at free edges, joints, matrix cracks, and under out-of-plane loading. Delamination is often the dominating failure mode in laminates subjected to impact and fatigue loading.

Idealized models of edge delamination exhibit singular concentrations of interlaminar shear and peel stresses near edges [2]. High interlaminar stresses occur in the vicinity of cracks in primary reinforcing plies. This is especially dangerous because interlaminar stresses act on an unreinforced plane. Such a plane is always present between the plies with different fiber orientations.

A number of methods to prevent delamination have been developed over the years [3, 4]. These include matrix toughening, optimization of stacking sequence, laminate stitching, braiding, edge cap reinforcement, critical ply termination, and replacement of a stiff ply by one that has softer regions. Most designs to reduce delamination resulted in significant cost or weight penalties.

One attempt to improve delamination resistance involves the modification of the chemistry of the resin composites to increase resin fracture toughness while maintaining composite compression strength. Most methods of increasing the fracture toughness of a brittle resin, such as an epoxy, involve the addition of at least one component with a lower shear modulus than the resin base. This approach is disadvantageous in that it reduces the overall shear modulus, often below that necessary to maintain composite compression performance, and increases the susceptibility of the composite to heat and solvents.

Ductile interleaving [5] is an effective method to improve delamination resistance. Layers of toughened resins (interleaves) are inserted at interfaces between the primary plies in this method. Rubber or thermoplastic particle toughening is often utilized. Substantial improvement in interlaminar fracture toughness was achieved by this method. However, the thickness of the toughened interleaves is usually comparable to the thickness of the primary reinforcing plies. Accordingly, this method is generally only suitable for use at critical interfaces. The use of these interleaves at multiple interfaces may substantially increase weight and/or reduce in-plane properties of laminates.

Another approach to prevent delamination of fiber reinforced composite materials has been to add more mass to keep the stresses low. This approach, however, is disadvantageous in that it substantially reduces the weight savings advantage associated with fiber reinforced resin composites.

Another approach used to solve the delamination problem is to design discrete portions of a composite to have a substantially higher stiffness than the remainder of the composite. The stiffer portions become the primary load carrying paths and can be varied to meet structural requirements. The disadvantage of this approach is that it places severe restrictions on design. Also, weight is increased by the material added to discretize the stiffness of various load paths. The end result is a structure that is heavier and more difficult to manufacture than composite structures that do not have these design constraints.

Delamination resistance of fiber reinforced resin composites can be improved by cross-ply stitching laminate plies together. While this method does not substantially increase weight, it increases production costs. Also, this technique may be difficult to implement in composites structures having complicated structural configurations.

Also, the interlaminar fracture toughness of composites employing a high temperature, e.g., polyimide, matrix material is generally superior to those employing a brittle thermoset resin matrix material, e.g., epoxy. However, there is experimental evidence for interface degradation and delamination due to matrix microcracking after thermal aging.

Reinforcement of interfaces in laminates by fibers of conventional diameters has been experimentally explored [6]. Random mats of commercial polyaramid, polyester, and glass fibers were studied. Improvement in the Mode I critical energy release rate was reported for all in-lay materials. Best results were obtained with polyaramid fibers combined with a toughened epoxy adhesive. However, the thickness of the inner, randomly reinforced layer was equal or higher than the thickness of primary reinforcing plies. Further, fiber mats required preimpregnation. The toughened adhesive layer required additional curing, leading to some embrittlement of the primary plies. Structurally, thick interlayers reinforced by fibers of conventional diameters can be regarded as additional plies rather than interface modifiers. High thickness of these layers and low volume fraction of randomly distributed fibers lead to substantial reduction of in-plane properties, such as compression strength, of laminates.

It would, therefore, be desirable to provide improved composites providing better damage tolerance due to delamination resistance and microcrack arresting properties.

It would also be desirable to provide a technique for imparting delamination resistance and microcrack arresting capability to a composite material that is inexpensive, does not require a significant increase in weight or volume of the resulting composite, and requires only minimal effect on current laminating techniques and facilities.

SUMMARY OF THE INVENTION

The present invention is directed to a composition of a fiber reinforced composite material comprising a resin matrix and primary reinforcement fibers and further comprising secondary reinforcement fibers at one or more ply interfaces wherein secondary reinforcement fibers have diameters smaller than the primary reinforcement fibers. The secondary reinforcement fibers may be distributed over the entire ply interface, or, may be distributed over an individual part or individual parts of a ply interface.

The present invention discloses a novel concept of small fiber reinforcement of interfaces. The key in this delamination suppression concept is the small diameter of fibers used for the modification. Small fibers reinforce laminate interfaces without substantial reduction of in-plane properties. Each laminate interface can be reinforced by small fibers without substantial increase in weight or thickness. Given the minimal effect on weight and thickness, the present invention is not limited to reinforcement of only critical interfaces and may be used for reinforcement of a plurality of ply interfaces or all ply interfaces.

Small fiber reinforcement according to the present invention is capable of improving interlaminar toughness, strength, and delamination resistance for static, fatigue, and impact loadings of composite materials. Delamination resistance is improved for all types of interlaminar stresses and delamination sources, including normal (peel) and shear stresses produced by direct out-of-plane loads or by in-plane shearing, tensile and compressive forces due to ply property mismatches, such as Poisson's coefficient mismatch and extension-shear coefficient mismatch. The small fiber reinforcement is useful in both suppressing and arresting delamination from any source, including matrix cracks, free edges, notches or holes, ply drops, bonded joints, bolted joints, out-of-plane loading, and so forth.

The present invention is advantageous in that preimpregnation of the small fibers is optional, but not necessary. In a preferred embodiment, there is no preimpregnation of the small fibers. The small fibers are flexible and are expected to conform to the shape and distribution of the primary reinforcing fibers at the interface as the resin flows. Therefore, the resin rich zones near the primary ply surfaces are reduced or eliminated. However, it will be recognized that the small fibers may be preimpregnated and, if desired, any excess resin may be squeezed out for the purpose of reducing or eliminating resin rich zones. It is believed that the delamination suppression is achieved through both improvement of interlaminar fracture toughness and reduction of interlaminar stresses by smearing the mismatch of ply properties in multidirectional laminates.

The diameter of conventional reinforcing fibers used in advanced composites typically varies from several micrometers up to hundreds of micrometers and even millimeters. Such conventionally employed fibers, include, for example, graphite, boron, glass, and ceramic fibers with diameters ranging to several hundred millimeters and even millimeters. In implementing the small diameter reinforcement of the present invention, generally, about one order of magnitude difference in diameter between the primary reinforcement fibers and the smaller secondary interlaminar reinforcement fibers will be sufficient. Where the primary reinforcement fibers are relatively large, fibers of conventional diameters (i.e., on the order of microns) are suitable for use as the secondary smaller interlaminar fibers. Where the primary reinforcement fibers are relatively small (i.e., micron range or smaller), then fibers of smaller diameters are needed to implement the concept described above. Therefore, depending on the diameter of the primary reinforcement fibers, fibers of submicron diameters (nanofibers) may be needed for interface reinforcement in accordance with the present invention.

BRIEF DESCRIPTION OF THE DRAWINGS

The detailed description of the invention may be best understood when read in reference to the accompanying drawings wherein.

DETAILED DESCRIPTION OF THE INVENTION

Here follows a description of various embodiments of the invention. It is to be understood that both the foregoing general description and the following detailed description are exemplary and explanatory only and are not restrictive of the invention as claimed.

As stated above, the present invention is directed to improved laminate materials, preferably reinforced composites, and most preferably advanced polymer matrix composites, wherein lamina-lamina interfaces are reinforced with fibers having a diameter smaller than the primary reinforcing fibers. The main structural fibers are referred to herein as "primary reinforcing fibers" and the fibers used to reinforce the ply interfaces are referred to as "secondary reinforcing fibers."

As stated above, in polymer matrix composites primary reinforcement fiber materials are added to the resin system to provide strength to the finished part. The selection of reinforcement material is based on the properties desired in the finished product. These materials generally do not react with the resin but are an integral part of the composite system. The present invention is not limited to the use of any particular primary reinforcing fiber. Any suitable fiber or filamentary material may be used as the primary reinforcement in the layers of composite material according to the present invention. Such primary reinforcement fibers are generally known in the art and include, but are not limited to alumina, aluminosilicate, aramid (such as Kevlar®, Twaron®, or other aramid fibers), black glass ceramic, boron (e.g., boron on titania, boron on tungsten, and so forth), boron carbide, boron nitride, carbonaceous fibers, such as carbon or graphite fibers, ceramic fibers, glass fibers (such as A-glass, AR-glass, C-glass, D-glass, E-glass, R-glass, S-glass, S1-glass, S2-glass, and other suitable types of glass), high melting polyolefins (e.g., Spectra® fibers), high strength polyethylene, liquid crystalline polymers, metal fibers, metal coated filaments, such as nickel, silver, or copper coated graphite fiber or filament, and the like, nylon, paraphenylene terephthalamide, polyetheretherketone (PEEK), polyetherketone (PEK), polyacrylonitrile, polyamide, polyarylate fibers, polybenzimidazole (PBI), polybenzothiazole (PBT), polybenzoxazole (PBO), polybenzthiazole (PBT), polyester, polyethylene, polyethylene 2,6 naftalene dicarboxylate (PEN), polyethylene phthalate, polyethylene terephthalate, polyvinyl halides, such as polyvinyl chloride, other specialty polymers, quartz, rayon, silica, silicon carbide, silicon nitride, silicon carbonitride, silicon oxycarbonitride, titania, titanium boride, titanium carbide, zirconia toughened alumina, zirconium oxide, and so forth. Mixtures of any such suitable fibers may also be employed. The types of fiber most commonly used in advanced composites are carbon/graphite, aramid, and glass fibers.

The primary reinforcement fibers may be present in any of the various conventional forms. Such forms include, for example, monofilament fiber, multifilament yarn, tow, or roving, chopped strand, acicular particles, woven or nonwoven fabric, mat, unidirectional tape, and so forth. When prepreg materials are used, fabrics, mats, or tapes are typically used as the primary reinforcing fiber.

Advanced composite systems are divided into two basic types, thermosets and thermoplastics, with thermosets being by far the predominant type. Composite manufacturing processes generally involve the combining of a resin, a curing agent, and some type of reinforcing fiber. Typically, heat and pressure are used to shape and cure the mixture into a finished part. Thermosets require a curing step to produce a cured or finished part. Once cured, the part cannot be changed or reformed. Thermoplastics currently represent a relatively small part of the PMC industry. They are typically supplied as nonreactive solids (no chemical reaction occurs during processing) and require only heat and pressure to form the finished part. Unlike the thermosets, the thermoplastics can usually be reheated and reformed into another shape, if desired.

The invention is not limited to any particular matrix material. Any suitable matrix material may be employed. The matrix material may be, for example, thermosetting materials based on epoxy resins, biscitraconicimide (BCI), bismaleimides (BMI), bismaleimide/triazine/epoxy resins, cyanate esters, cyanate resins, furanic resins, phenolic resins, urea-formaldehyde resins, melamine-formaldehyde resins, phthalocyanine resins, polyacrylates, polybenzoxazole resins, polybutylene, polyester resins, polyimides, including high temperature polyimides such as PMR, PMR-15, and DMBZ polyimides), acetylene terminated polyimide resins, polyurethanes, silicones, tetrafluoroethylene, tetrafluoroethylene-hexafluoropropylene copolymers, triazines, alkyds, unsaturated polyester (UP) resins, vinyl ester resins, vinyl esters, xylene resins, specialty polymers, and so forth.

The matrix material may also be thermoplastic materials based on acrylonitrile butadiene styrene (ABS) copolymers, aromatic polycarbonates, aromatic polyesters, carboxymethylcellulose, ethyl cellulose, ethylene vinyl acetate copolymers, polyacetals, polyacetates, polyacrylonitrile and other nitrile resins, polyacrylonitrile-vinyl chloride copolymer, polyamides, aromatic polyamides (aramids), polyamide-imide, polyarylates, polyarylene oxides, polyarylene sulfides, polyarylsulfones, polybenzimidazole, polybutylene terephthalate, polycarbonates, polyester imides, polyether sulfones, polyetherimides, polyetherketones, polyetheretherketones, polyethylene terephthalate, polyimides, polymethacrylate, polyolefins (polyethylene, polypropylene), polyallomers, polyoxadiazole, polyparaxylene, polyphenylene oxides (PPO), modified PPOs, polystyrene, polysulfone, polytetrafluoroethylene, polyvinyl acetate, polyvinyl alcohol, polyvinyl halides such as polyvinyl chloride, polyvinyl chloride-vinyl acetate copolymer, polyvinyl pyrrolidone, polyvinylidene chloride, specialty polymers, and so forth.

Also, other elastomeric or rubber materials may be employed as the matrix material, including, but not limited to butadiene-acrylonitrile copolymers, ethylene butadiene block copolymer, ethylene-propylene base copolymer, natural rubber, polychloroprene rubber, polyisoprene-isobutylene copolymers, silicone rubber, styrene-acrylonitrile copolymers, styrene-butadiene copolymers, styrene-maleic anhydride copolymers, and so forth.

In one embodiment, the matrix material may be a toughened resin material. Methods of improving the toughness of resins, such as the thermoset resins listed above, wherein elastomeric or thermoplastic particles are incorporated into the resin matrix system, are well known in the art and are attractive for use with the small fiber interlaminar reinforcement according to the present invention, particularly where it is desired to produce a composite material with increased toughness, such as toughness against impact induced damage. In one embodiment, the matrix material may be a thermosetting resin toughened with elastomeric or thermoplastic particles. In another embodiment, the matrix material may be an epoxy, cyanate, or bismaleimide resin toughened with elastomeric or thermoplastic particles. In yet another embodiment, the matrix material may be an epoxy resin toughened with elastomeric or thermoplastic particles.

Other suitable matrix materials operable to embody the present invention include metal matrixes, such as aluminum and titanium, ceramic matrixes, glass matrixes, carbon matrixes, and the like.

Any other conventional additives may optionally be present in the matrix system which include, but are not limited to, flame retardants, catalysts, promoters, or hardeners, such as curing or cross-linking catalysts or catalysts to promote the growth of conductive materials, fillers such as quartz powder to reduce thermal expansion or other relatively inert materials which may be added to reduce cost, or other fillers or extenders used to modify mechanical properties, serve as a base for color effects, or to improve surface texture, extenders, or to dilute or extend high cost resins without significant lessening of properties, inhibitors, thixotropic agents, adhesion promoters, any other additive capable of exerting a positive effect on the substrate and during processing such as finishing agents to improve matrix to fiber coupling or a noble metal or noble metal compound to make the material catalytic for electroless deposition of copper, and so forth. Such additives and their use are generally known to those skilled in the art.

The primary reinforcement fiber content by volume in the matrix will usually be from about 5 percent to about 90 percent, typically from about 40 percent to about 70 percent, and may be varied appropriately depending on the particular purpose for which the composite is to be used.

The secondary reinforcement fibers may be any of the fibers listed above as being useful as primary reinforcement fibers. The key in this delamination suppression concept is the use small diameter fiber. The term small diameter refers to the diameter of the secondary reinforcement fiber relative to the diameter of the primary reinforcement fiber.

The diameter of the secondary reinforcement fiber will be sufficiently smaller if it provides laminate interface reinforcement without substantial reduction of in-plane properties and/or without substantial increase in weight and/or ply thickness. In a preferred embodiment, a nonwoven mat is used for the secondary reinforcement fiber. The mat may be made from short fibers, long discontinuous fibers, continuous fibers, acicular polymers, particles, or crystals, and so forth. The thickness of the mat is most preferably small enough that no preimpregnation of the small diameter fibers is needed. Advantageously, the thin fiber mat can be attached to one side of a conventional prepreg prior to lamination, for example, simply by placing onto the prepreg. The thin fibers are flexible and are expected to conform to the shape and distribution of the primary reinforcing fibers at the interface as the resin flows, thereby reducing or eliminating resin rich zones near the primary ply surfaces. While not intending to be bound by any particular theory, it is believed that the delamination suppression according to the present invention is achieved through both improvement of interlaminar fracture toughness and reduction of interlaminar stresses by smearing the mismatch of ply properties in multidirectional laminates.

As stated above, fibers of smaller diameters relative to the primary reinforcement fibers are needed to implement the present invention. Thus, the diameter of the secondary reinforcement fibers will depend on the diameter of the primary reinforcement fibers. As stated above, the diameter of the secondary fibers is sufficiently small if it provides laminate interface reinforcement without substantial reduction of in-plane properties and/or without substantial increase in weight and/or ply thickness. Typically, the smaller diameter secondary fibers according to the present invention will generally have a diameter of approximately one-third, or less, of the diameter of the primary reinforcing fiber. In one embodiment, the diameter of the secondary reinforcement fiber will be about one-fourth, or less, of the diameter of the primary reinforcing fiber. In another embodiment, the diameter of the secondary reinforcement fiber will be about one-fifth, or less, of the diameter of the primary reinforcing fiber. In a most preferred embodiment, there will be a difference of about one order of magnitude or greater between the primary and secondary reinforcement fiber diameters. Where the primary reinforcing fibers are of a relatively large diameter, secondary fibers of sufficiently small diameter may be obtained from conventional means or may otherwise be readily commercially available. When the diameter of primary reinforcing fibers themselves are relatively small in diameter, sufficiently small diameter secondary reinforcement fiber may have a more limited availability. For example, if it is desired to employ fibers having a diameter of several micrometers as the primary reinforcing fibers (such as graphite fibers having a diameter of about 5–7 micrometers as may be typically employed in advanced composites), then fibers of submicron diameters (hereinafter referred to as "nanofibers") will be required.

Several types of small diameter fibers are available. These include, but are not limited to, ceramic or metal whiskers, microdrawn metals, small carbon fibers, asbestos fibers, natural fibers such as cellulose and the like, and polymer fibers produced by air blowing, blend spinning, electrospinning, phase separation of copolymers orpolymerblends, and so forth.

A new technology of manufacturing thin polymer fibers by electrospinning has been developed and studied. The method is based on the principle of spinning polymer solutions in a high-voltage electric field. It consists of the ejection, from the end of a capillary tube, of a charged jet of a liquid polymer, such as a polymer solution or molten polymer, which is elongated and accelerated by an external field. Nanofibers have been prepared by electrospinning from over thirty different synthetic and natural polymers, including high-temperature polyimide and polyaramid fibers. Electrospinning typically produces fibers having a diameter of about 5 to about 5000 nm, although fibers with diameters as small as three nanometers have been produced by this method. The method can be used to produce random nonwoven mats of fibers suitable for interface reinforcement. Any type of polymer can be electrospun to produce nanofibers, so long as it can be dissolved in an appropriate solvent or solvent mixture to make a concentrated solution (although in some cases the polymer melt may also be used) and the molecular weight is high enough. Table 1 below lists polymers that have been successfully electrospun into small diameter fibers.

Figure 5:
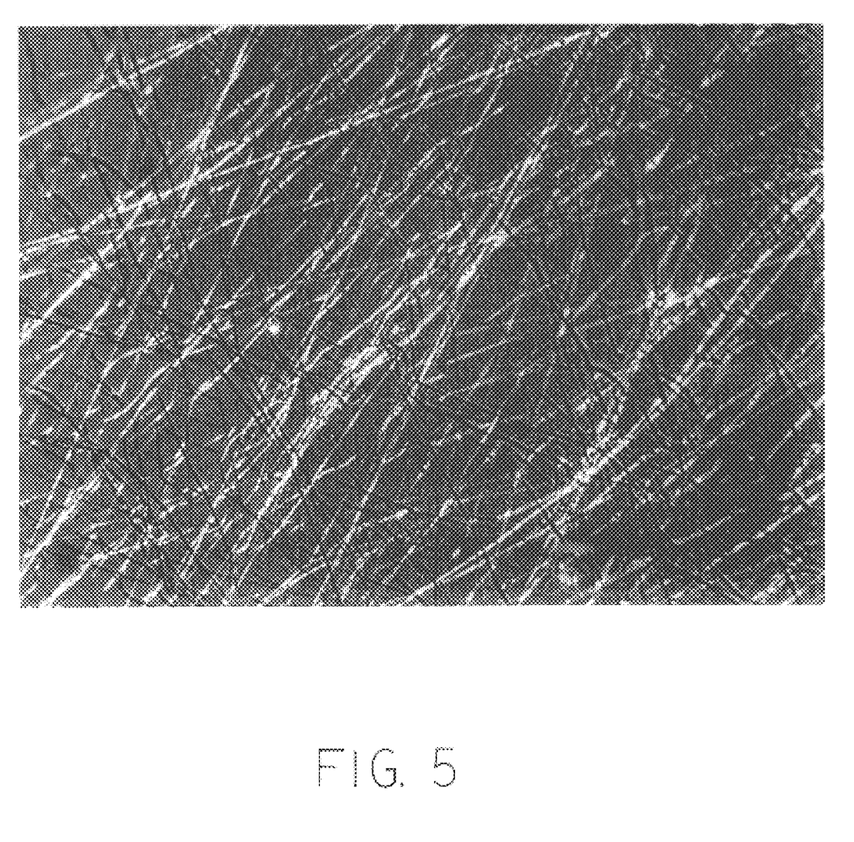
FIG. 5 shows a random mat of electrospun polyimide fibers.
Figure 6:
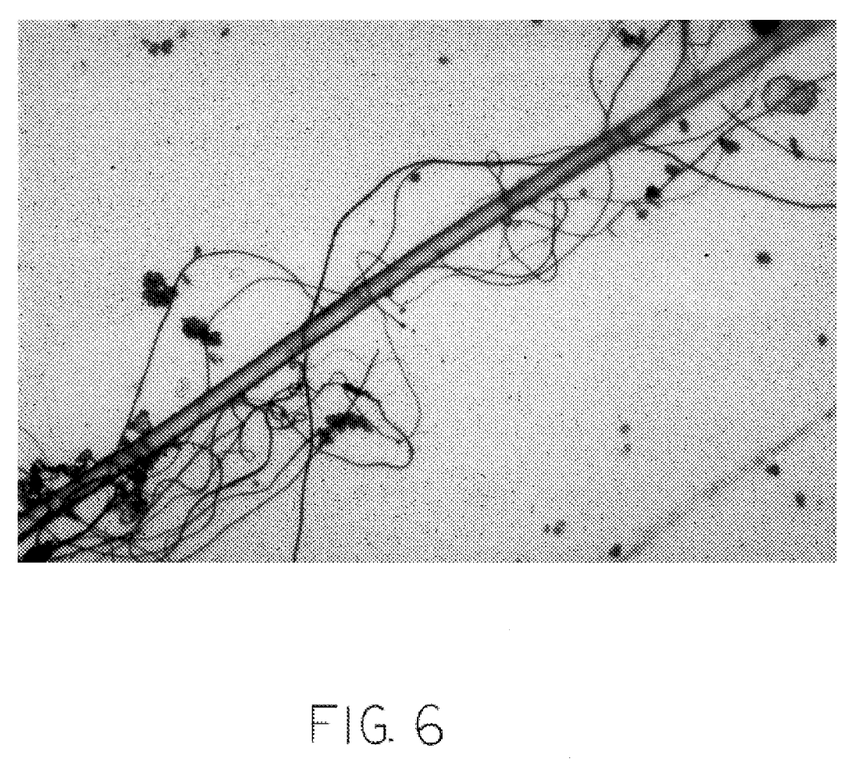
FIG. 6 shows commercial and electrospun Kevlar® fibers.

References [8–10], each of which is incorporated herein by reference, disclose a number of methods for making superfine fibers. Wente [8] discloses a method of making submicron fibers via extrusion into heated, high velocity air steams. Reneker et al. [9] describe the electrospinning process. Reneker [10] discloses electrospinning as well as other methods for making small diameter fibers. FIG. 5 shows a random mat of electrospun polyimide fibers useful in reinforcing ply interfaces in accordance with the present invention. FIG. 6 shows a commercial Kevlar® fiber and electrospun Kevlar® fibers. Small diameter metal fibers such as nickel or steel fibers having diameters in the range of several microns as well as in the range of one micron and smaller are also available and are suitable for ply interface reinforcement. Likewise, submicron carbon and ceramic fibers, including short fibers (whiskers) are also commercially available and suitable for ply interface reinforcement in accordance with the present invention.

TABLE 1

Electrostatically Spun Polymers.

| Polymer Class | Polymer | Solvent |
| --- | --- | --- |
| High performance polymers & liquid crystal polymers | Polyimides Polyamic acid Polyetherimide | Phenol m-Cresol Methylene chloride |

TABLE 1-continued

Electrostatically Spun Polymers.

| Polymer Class | Polymer | Solvent |
|---|---|---|
| | Nylon 6 & Nylon 66 | Formic Acid |
| | Polyaramid | Sulfuric acid |
| | Poly-gamma-benzyl-glutamate | Dimethylformamide (DMF) |
| | Poly(p-phenylene terephthalamide) | Sulfuric acid |
| | Polybenzimidazole (PBI) | dimethylacetamide (DMAC) |
| | Ultem 1000 (Polyether imide) | Chloroform |
| Copolymers | Nylon 6-Polyimide | Formic acid |
| | PET-PEN | Trifluoroacetic acid/dichloromethane |
| Textile fiber polymers | Polyacrylonitrile | Dimethylformamide |
| | Polyethylene terephtalate (PET) | Trifluoroacetic acid/dichloromethane |
| | Polypropylene | Melt in vacuum |
| | Nylon | Formic acid |
| Electrically conducting polymer | Polyaniline | Sulfuric acid |
| Biopolymers | DNA | Water |
| | Polyhydroxybutyrate-valerate | Chloroform |
| Polyethers | Polyethylene oxide (PEO) | Water & Water/ethanol |
| Polyesters | Polynaphthalene terephthalate (PEN) | Trifluoroacetic acid/dichloromethane |
| | Polybutylene terephthalate (PBT) | Trifluoroacetic acid/dichloromethane |
| Elastomers | Styrene-butadiene rubber (SBR) | Tetrahydrofuran (THF) |
| | Shell's Kraton (SBS) | THF/DMF or Chloroform/DMF |
| Other | Polystyrene (PS) | Toluene/DMF |
| | Polyacrylonitrile (PAN) | DMF or DMAC |
| | Mesophase Pitch | Melt spinning |
| | Polyvinyl chloride (PVC) | THF/DMF |
| | Polyvinyl alcohol (PVA) | Water |

The processes for the manufacture of laminates and laminated composites are well known to those skilled in the art and are widely practiced commercially, and such processes may be readily adapted to employ the thin fiber reinforcement of ply interfaces according to the present invention.

Figure 1:
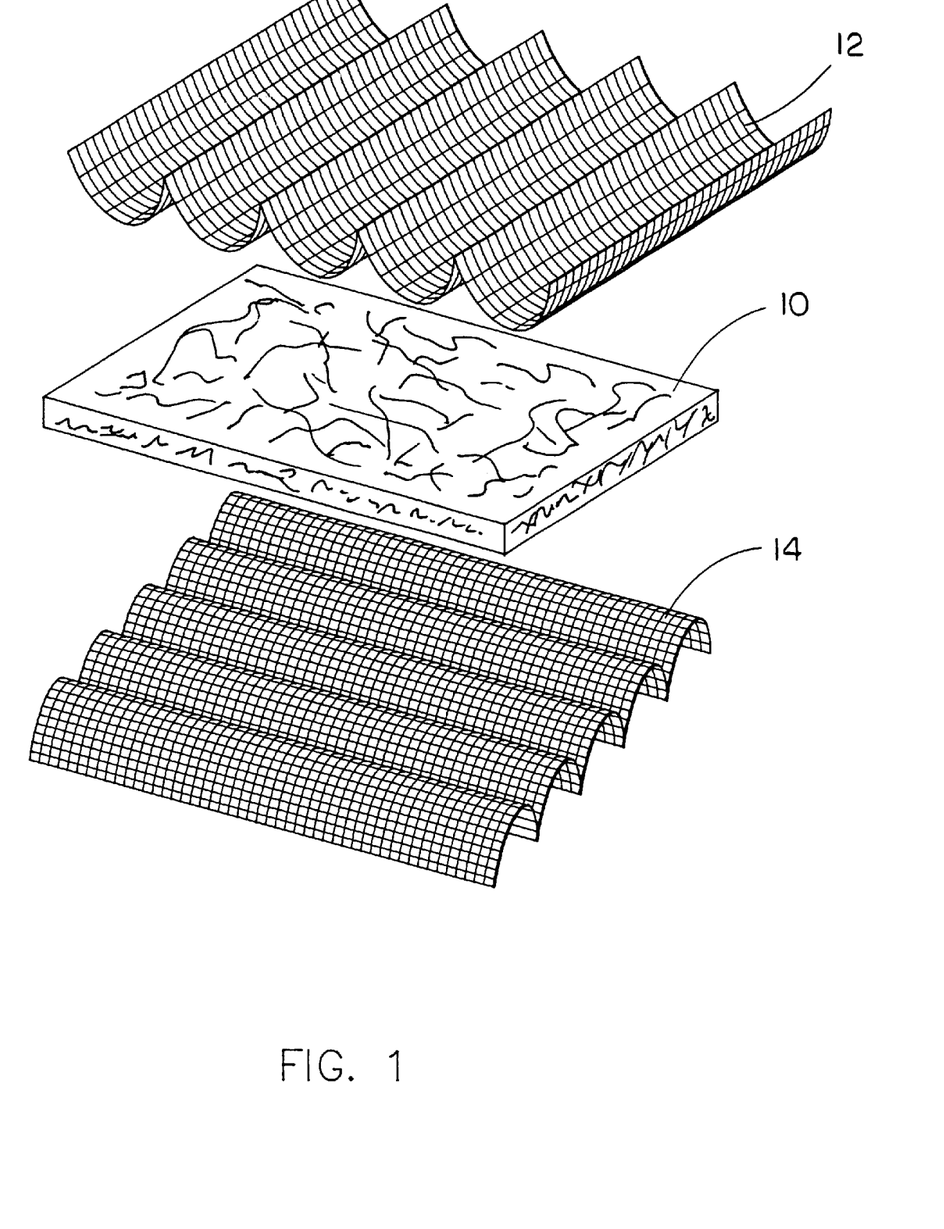
FIG. 1 illustrates the construction of a composite according to the present invention.

An embodiment illustrating the construction of a laminate material according to the present invention is depicted in FIG. 1. FIG. 1 depicts a single ply-ply interface wherein thin a fiber mat 10 is placed between plies 12 and 14 comprising primary reinforcement fibers. The plies 12 and 14 and small diameter fiber mat 10 are formed into the laminate through the introduction of matrix material and consolidation or bonding of the three layers, e.g., through the application of heat and pressure. The matrix material may be introduced either before or after the lay up of plies 12 and 14. In one embodiment, plies 12 and 14 may be impregnated with resin. The resulting composite comprises a strong and toughened interlaminar interface with minimal increase in ply thickness and weight over that which is obtained without the small diameter fiber reinforcement. This is unlike the prior art technique described above [6] in which fiber reinforcement using fiber of conventional diameter essentially resulted in an additional ply. The present invention is also unlike the technique of using an adhesive or resin layer at the interface between layers in the composite wherein it is desirable that the reinforcement layer remains a discrete layer and maintains separation between the fiber reinforced layers. See for example, U.S. Pat. No. 5,057,353. In accordance with the present invention, the secondary reinforcement fiber penetrates the adjacent resin layers and, most advantageously, penetrates the primary reinforcement fiber network.

Although FIG. 1 is depicted in exploded view for illustrative purposes, the actual manner of construction may be accomplished in a number of ways. For example, one aspect of the present invention relates the modification of a conventionally formed or commercially supplied prepreg by placement of the secondary reinforcement fiber on the surface thereof. The manufacture of prepregs are generally known in the art and may be prepared, for example, by dipping the primary reinforcement fibers through a resin (i.e., solution), or, alternatively, by impregnating the primary reinforcement fibers through heat to melt the resin and pressure to force the resin into the fiber network. Once the prepreg is formed (or obtained commercially), the improved mat according to the present invention can be formed by attaching the secondary reinforcement fiber to the prepreg. In one embodiment, where the small diameter fibers are in the form of a mat, fabric, and so forth which can be handled, the small diameter fibers may be placed by hand on the prepreg. In another embodiment, where the small diameter fibers are not in an easily handled form, for example, whiskers or short fibers not in a mat form, the fibers may be distributed over the surface of the prepreg, for example, from an gas or liquid suspension. In one embodiment, the short fibers may be distributed by spraying a gas, i.e., air, or liquid suspension thereof. In yet another embodiment, the secondary reinforcement fiber may be spun directly onto the surface of the prepreg using conventional spinning techniques, including electrospinning. In one embodiment, the fibers may be spun from a polymer solution, polymer melt, or from a fluid mixture of polymerizing reactants. In another embodiment, the fibers can be made by removal of the matrix after phase separation into fiber from a mixture containing dissolved polymer.

In forming laminates prepared from prepregs having the small fibers attached thereto, it is preferable to employ pressure, with or without the application of heat, in the molding or shaping of the composite materials prepared with secondary reinforcement at the ply interfaces in accordance with the present invention in order to completely fill the interstices of the both the primary and secondary reinforcement materials and to wet the surface of both the primary and secondary reinforcement fibers. Exemplary molding techniques include compression molding, pressure bag molding, vacuum bag molding, low pressure molding (e.g., 200 psi or less), and the like. It will be recognized, however, that the present invention is not limited to the use of pressure or compression in the molding or curing process, and the use of secondary reinforcement between plies in accordance with the present invention is also suitable for contact molding applications, and the like, wherein reinforcement and resin are placed on a mold and cured, e.g., at room temperature using a catalyst-promoter system or by heat in an oven, wherein no additional pressure is used.

In a preferred embodiment, the present invention comprises a prepreg having a random mat of continuous electrospun fiber attached to one side of the prepreg. The mat may be separately formed by electrospinning and then simply placed onto one side of the prepreg. Alternatively, the secondary reinforcement fiber may be electrospun directly onto the prepreg. In either case, the prepreg will typically have sufficient tack such that no additional adhesive or resin will be necessary to maintain placement of the secondary reinforcement fiber on the prepreg surface.

In fashioning a laminate from the composite plies according to the present invention, many of the conventional fabrication techniques and equipment maybe employed. One such technique involves the hand lay-up of prepreg wherein a prepreg product is laid down and formed to the desired shape and number of layers. After forming, the lay-up assembly may then be cured, e.g., by moving the assembly to an autoclave for cure under heat and pressure. Delamination resistant composites in accordance with the present invention may thus be prepared wherein at least one of the ply surfaces or at least one part of one or more of the ply surfaces forming the interface between layers comprises the secondary reinforcement fibers. Since the present invention adds little thickness and weight, it is advantageous to provide the secondary reinforcement according to the present invention to more than one of the ply interfaces. Most advantageously, the secondary reinforcement fiber is present at each ply interface.

In like manner, a prepreg having secondary fiber attached to one side thereof may be employed in an automated tape lay-up process wherein prepreg tape material is fed through an automated tape application machine and applied across the surface of a mold in multiple layers under automated or preprogrammed control.

Similarly, the present invention may be adapted for application to other fabrication techniques which give rise to a laminated part. For example, in filament winding, composite articles may be prepared by the wrapping a prepreg material, such as preimpregnated roving, fabric, woven roving, tape, wires, filaments, yarns, etc., around a mandrel or other form or core structure. Accordingly, it is contemplated that prepregs having the secondary reinforcing small fibers thereon, in accordance with the present invention, will improve the delamination resistance of such articles wherein each revolution of the mandrel adds a layer or ply.

It will also be recognized that the present invention is not limited to composite fabrication techniques employing prepreg. For example, the use of small fiber reinforcement may also be employed with a wet filament winding process wherein continuous primary fiber reinforcement materials (filament, wire, yam, tape, etc.) are drawn through a container of resin mixture and formed onto a rotating mandrel to achieve a desired shape and then cured, e.g., in an oven. In accordance with the present invention, the secondary reinforcement fibers may be placed or otherwise distributed onto the resin coated fibers during the winding process.

Other processes, not requiring prepreg materials, which are suitable for use with the secondary fiber reinforcement according to the present invention include, for example, processes involving the use of preforms. Preforms are pre-shaped fibrous reinforcements, e.g., of chopped fiber, mats, or cloth. Preforms may be used to approximate the desired shape and thickness of the finished part. The preform may later be infused with a resin mixture and cured to form a composite part, e.g., by transferring to a mold press and pouring or injecting the resin mixture into the mold cavity. Where the finished part is to have two or more layers of primary reinforcing fiber, the principle of using a secondary reinforcement fiber to increase interlaminar toughness may be accomplished during manufacture of the preform by placement of small diameter fibers in between the layers of primary reinforcing fiber in at least one interface between layers or at one or more portions of at least one ply interface. In like manner, the use of preforms comprising the secondary reinforcement fibers at one or more ply interfaces in accordance with the present invention may also be readily adapted to reaction injection molding techniques and processes wherein two or more streams of reactive resin systems are combined to form the matrix material.

Resin transfer molding processes may also be adapted for use in implementing the present invention in a manner similar to that described above in reference to the use of preforms. In resin transfer molding, primary fiber reinforcement, e.g., tape, fabric, mat, etc., is laid into a mold. The resin mixture is poured or injected into the mold cavity and the part is then cured. Thus, where the part is to have two or more layers of reinforcement fiber, the principle of the present invention of using a secondary reinforcement fiber may be accomplished during manufacture of the reinforcement fiber lay-up by placement of small diameter fiber between layers of primary reinforcing fiber for at least one ply interface, or one or more part or parts of such interfaces. Similarly, reaction resin transfer molding techniques, wherein two or more streams of reactive resin systems are combined to form the matrix material, may be adapted to the above described reinforcement fiber lay ups incorporating the small diameter fiber reinforcement at one or more ply interfaces, or any part or parts thereof.

It will be recognized that the novel concept of small diameter fiber reinforcement according to the present invention is not limited to laminate interfaces of fiber reinforced composite materials and that the use of small fiber reinforcement according to the present invention may be applied to virtually any adhesive interface, including laminate materials not having primary reinforcement fibers. For example, interlayers consisting of toughened adhesive films such as resins toughened with thermoplastic or elastomeric particles may be reinforced with small diameter fibers to form interlayers having improved stiffness and strength.

EXAMPLES

Figure 2A:
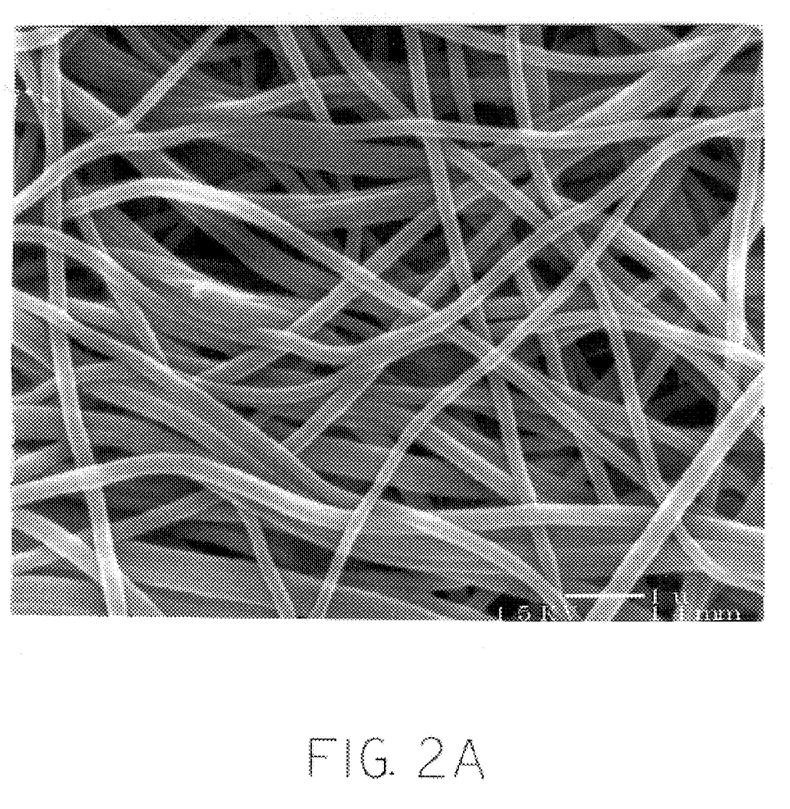
FIG. 2A shows an SEM image of a non-woven micro spun PBI sheet according to the present invention.

Non-woven fabrics of polybenzimidazole (PBI) nanofibers with diameters ranging from 300–500 nanometers were manufactured by electrospinning. This temperature resistant, linear polymer with glass transition temperature about 430° C. is used in thermal-protective, fire-blocking, and other aggressive temperature and environment applications. The sheets of electrospun PBI nanofibers were washed in water, treated with 50% sulfuric acid to improve the strength of the fibers, and dried at 200° C. The a real weight of the resulting fiber mats was 6.85 g/m$^2$. A scanning electron microscope (SEM) picture of the non-woven PBI sheet used in preparing the composites according to the present invention is shown in FIG. 2A.

Figure 2B:
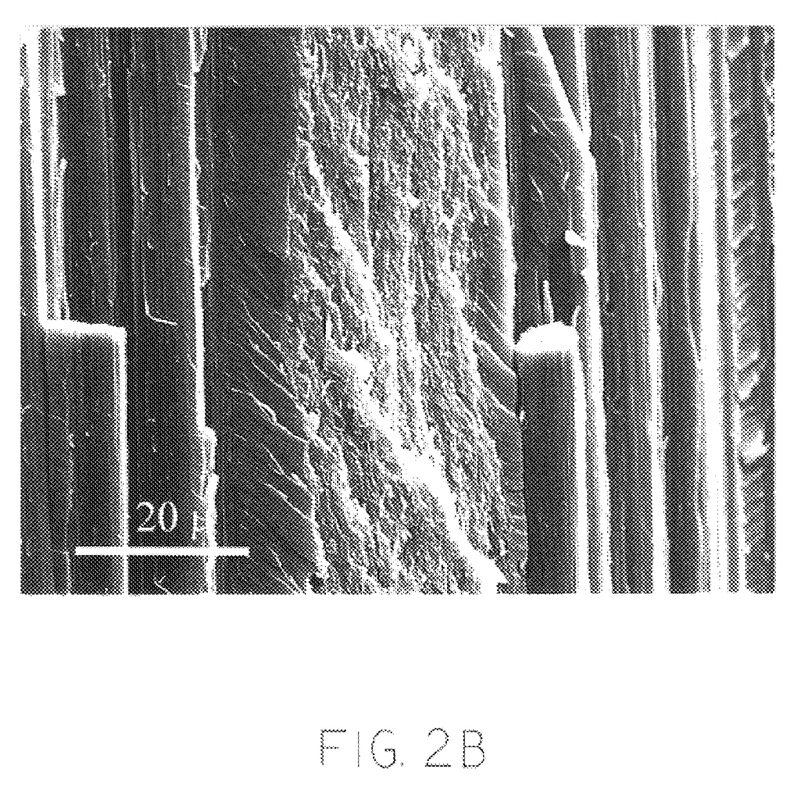
FIG. 2B shows a SEM image of the longitudinal cross-section of a laminate having small fiber reinforcement at the ply interfaces in accordance with the present invention.

Laminates with and without nanoreinforcement at interfaces were manufactured from a unidirectional graphite/epoxy prepreg T2G190/F263 provided by Hexcel Corporation. Unidirectional [$0_{20}$] composite panels were manufactured. Strips of thin Teflon® film were placed as crack starters at the midplane interface. No additional epoxy resin was used during manufacturing of specimens with nanofibers. A specialized press-clave was designed and built for proper impregnation and consolidation of PBI nanofibers in the laminates. Several graphite/epoxy composite panels with nanofiber reinforcement of interfaces were manufactured in controlled temperature, pressure, and vacuum environments. Reasonable quality consolidation was confirmed by SEM observations of the cross-sections (FIG. 2B) and ultrasonic nondestructive evaluation.

The consolidated thickness of the nanoreinforced interlayer was around 21 micrometers. Volume content of nanofibers in the interlayer, calculated from the measured interlayer thickness, mat areal weight, and PBI density (1.4 g/cm³), was 24%. The consolidated thickness of the primary graphite/epoxy ply in the laminate without PBI nanofibers was around 180 micrometers. Therefore, less than 12% increase in the total laminate thickness is expected if the nanofibers were used at each interlaminar interface. Estimated increase in the laminate weight calculated as a ratio of the aerial weights of the nanofiber sheet and the prepreg tape was 2.5%.

The Arcan test method [7] was used for interlaminar fracture testing. This test was selected for the experimental study due to the relatively small specimen size. The possibility of the mixed-mode interlaminar fracture testing was also taken into account. The two major fracture modes were studied: the opening, or peel mode (Mode I) and the sliding shear mode (Mode II). The 20-ply specimens were used in the comparative study. Interlaminar fracture testing was performed using MTS servohydraulic testing machine that was digitally upgraded with an Instron 8500 Series control and data acquisition system. Load-displacement curves were recorded at the constant stroke rate 0.5 mm/min. The maximum loads were extracted and used to calculate the critical stress intensity factors. The following expressions for the Mode I and Mode II stress intensity factors were used [7]:

$$K_I = \sigma_\infty \sqrt{\pi a} f_I(a/c)$$

$$K_{II} = \tau_\infty \sqrt{\pi a} f_{II}(a/c)$$

where $\sigma_\infty$ and $\tau_\infty$ are the "far-field" normal and shear stresses, a is the crack length, c is the dimension of the specimen along the crack, and the correction factors $f_I, f_{II}$, are defined as follows:

$$f_I(a/c) = 1.12 - 0.231(a/c) + 10.55(a/c)^2 - 21.27(a/c)^3 + 30.39(a/c)^4$$

$$f_{II}(a/c) = \frac{1.22 - 0.561(a/c) + 0.085(a/c)^2 + 0.180(a/c)^3}{[1-(a/c)]^{1/2}}$$

The strain energy release rate was obtained from the stress intensity factors using the following correlations [7]:

$$G_I = K_I^2 \left(\frac{S_{11}S_{22}}{2}\right)^{1/2} \left[\left(\frac{S_{22}}{S_{11}}\right)^{1/2} + \frac{2S_{12}+S_{66}}{2S_{11}}\right]^{1/2}$$

$$G_{II} = K_{II}^2 \frac{S_{11}}{\sqrt{2}} \left[\left(\frac{S_{22}}{S_{11}}\right)^{1/2} + \frac{2S_{12}+S_{66}}{2S_{11}}\right]^{1/2}$$

where $S_{ij}$ are the elements of the compliance matrix for a transversely isotropic unidirectional composite. Elastic constants of the unidirectional T2G190/F263 composite were obtained from the standard tensile quasi-static tests on [0₈], [90₁₆], and [(±45)₈]ₛ composite coupons: $E_1$=133 GPa, $E_2$=9.4 GPa, $G_{12}$=5.7 GPa, and $v_{12}$=0.37. The elements of the compliance matrix of the composite were computed using elastic relations for a transversely isotropic material.

Ten or more fracture specimens were tested for each mode. The calculated values of the critical energy release rates for laminates with and without nanofiber reinforcement of interface are presented below. Increase of 130% in the Mode II and 15% in the Mode I critical energy release rates were observed, as shown in Table 2 below.

TABLE 2

| Critical Energy Release Rate. | | |
| --- | --- | --- |
| Material | $G_{Ic}$ (kJ/m²) | $G_{IIc}$ (kJ/m²) |
| Original Laminate | 0.089 ± 0.036 | 1.17 ± 0.37 |
| Laminate with Reinforced Interface | 0.101 ± 0.444 | 2.67 ± 1.07 |

Figure 3A:
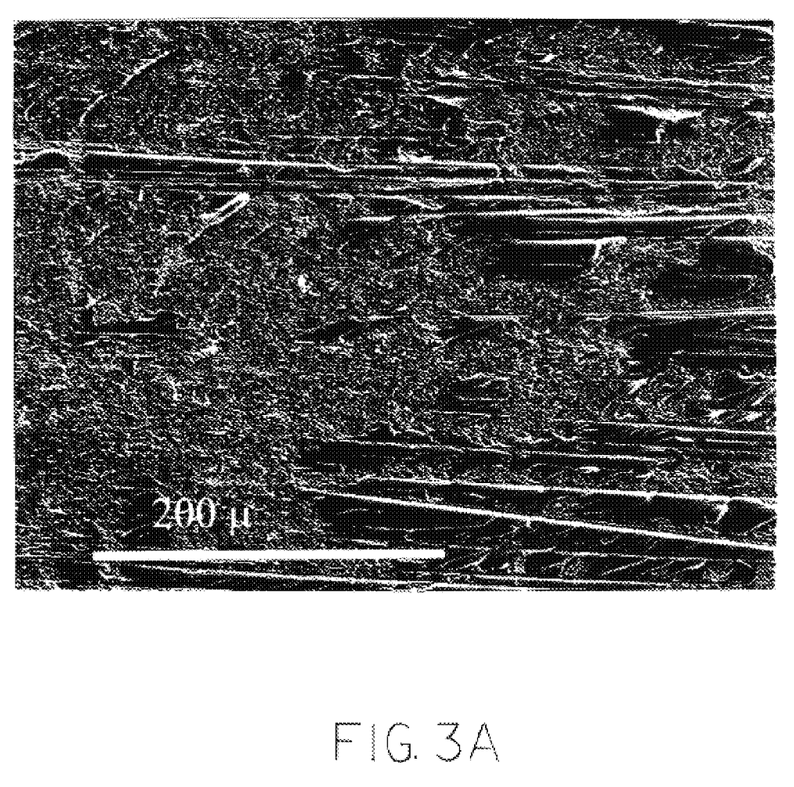
FIGS. 3A and 3B show SEM images of the Mode I fracture surface of the laminate with thin fiber reinforced interface.
Figure 3B:
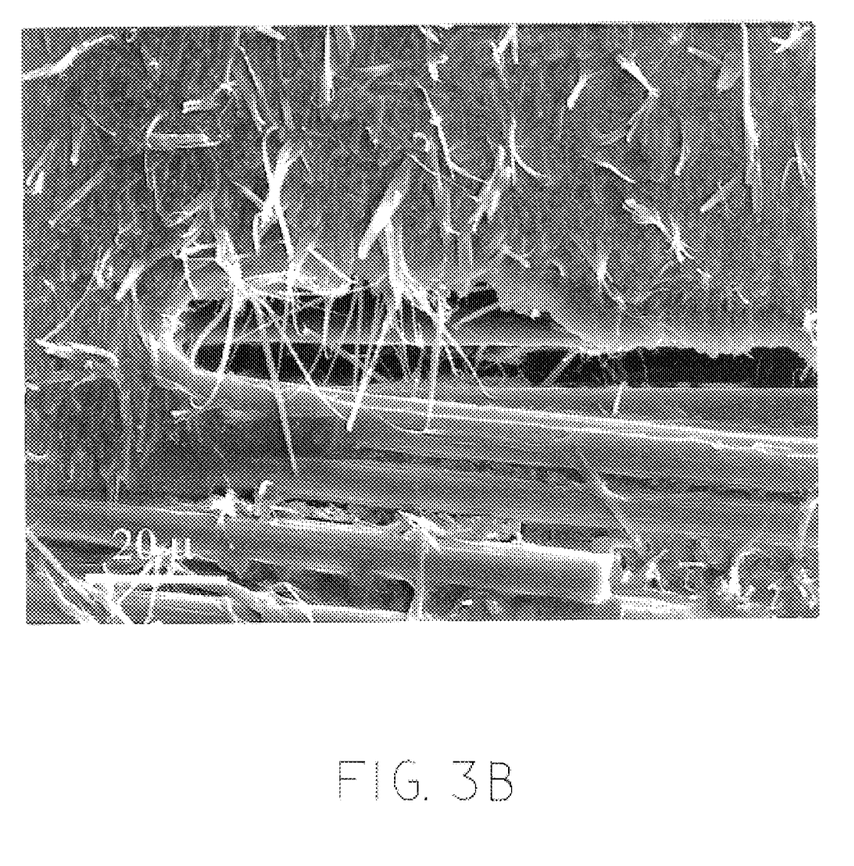
Figure 4A:
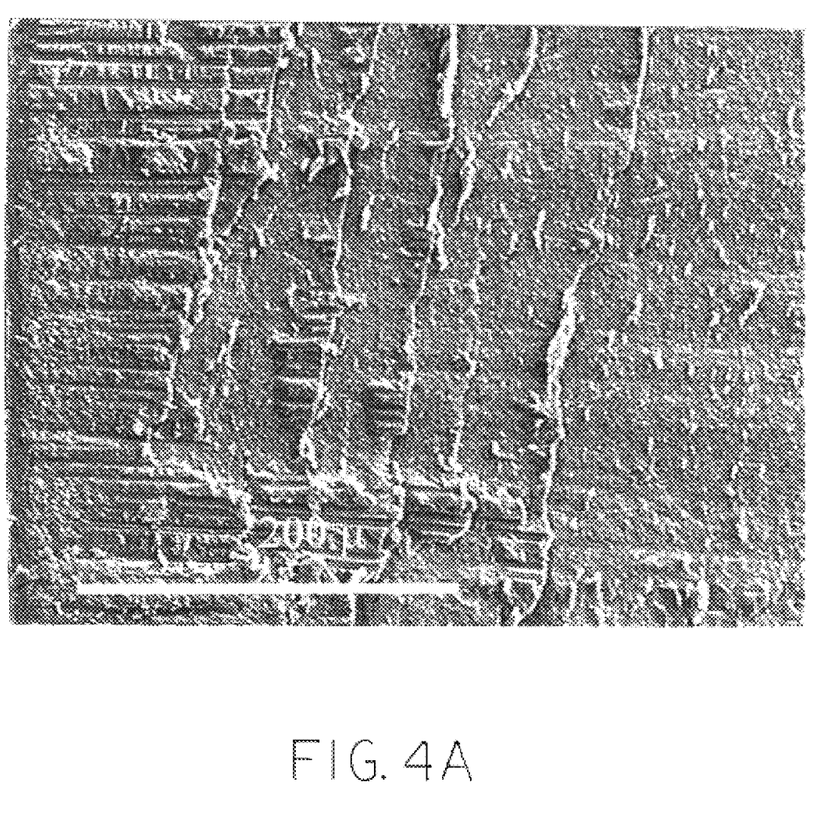
FIGS. 4A and 4B show SEM images of the Mode II fracture surface of the laminate with thin fiber reinforced interface.
Figure 4B:
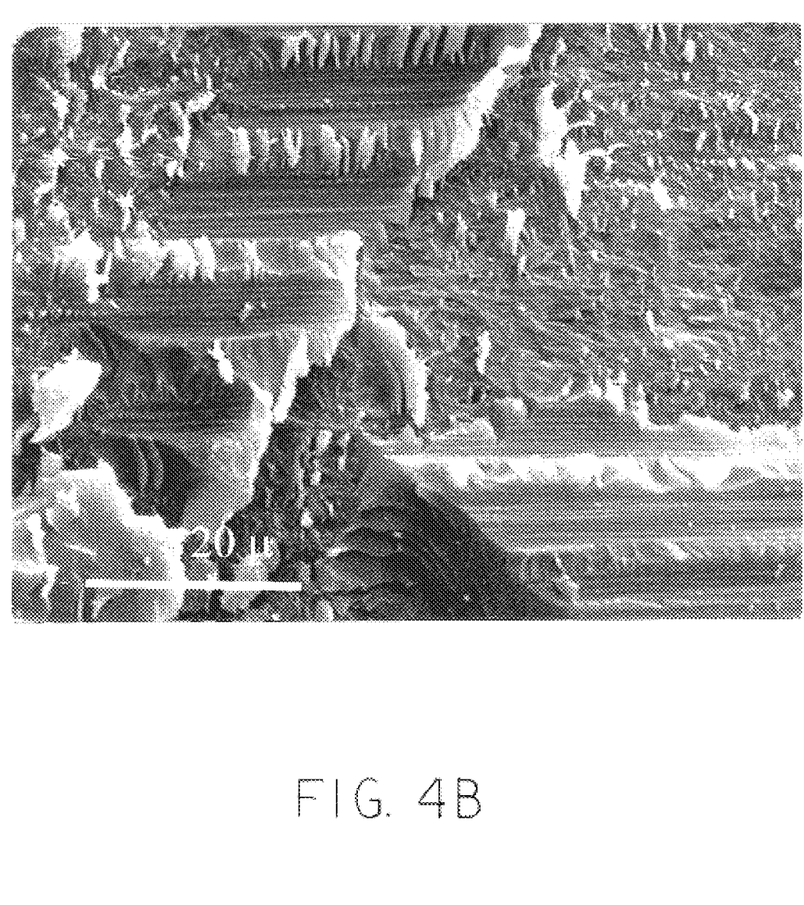

Optical images of the Mode I fracture surfaces of the specimens with nanoreinforced interface exhibited a variety of fracture modes including rather extensive intralaminar delamination. SEM images in FIGS. 3A and 3B show the transition from the fracture through the nanoreinforced interlayer to the fracture in the resin rich zone between the nanoreinforced interlayer and the primary ply. Pulled out PBI nanofibers in FIG. 3B indicate their substantial mechanical strength. Longitudinal splitting in the primary ply, observed in FIG. 5, may have facilitated deviation of the interlaminar crack into the primary ply. Optical and SEM images of the Mode II fracture surfaces revealed the crack path primarily through the nanoreinforced interlayer or through the interface between the interlayer and the primary ply (FIGS. 4A and 4B). Some intralaminar fracture of the primary ply was also observed. The extent of intralaminar fracture varied from specimen to specimen. Analysis showed that specimens with considerable intralaminar fracture demonstrated lower $G_{IIc}$ values.

Overall, the laminate with nanoreinforcement at the interface exhibited substantial increase in interlaminar fracture resistance compared to the unmodified laminate. This improvement was obtained with minimal increase of laminate weight. Fractographic observations indicate that intralaminar fracture of the primary plies may limit improvement of interlaminar fracture toughness in peel and shear.

Having described the invention of secondary reinforcement fiber by way of reference to particular materials, techniques, many additional variations and modifications will now become apparent to those skilled in the art without departing from the spirit and scope of the present invention as defined by the appended claims. For example, it will be recognized that the specific matrix materials and primary and secondary reinforcement fiber materials disclosed herein are provided as exemplary, illustrative, and explanatory purposes only. Any such listings of specific materials are not intended to be exhaustive and are not in any way limiting of the present invention as defined in the appended claims.

Also, it will be noted that specific methods and techniques of forming composite materials and parts have been discussed as being readily adaptable to employ the novel concept of small fiber reinforcement between layers. It will be recognized that the specific fabrication methods and techniques are exemplary only provided to illustrate and explain the principles of the invention. Such methods and techniques specifically mentioned are not intended in any way to provide a comprehensive or exhaustive listing and are not in any way limiting of the invention as claimed.

It is the intention of the appended claims to encompass and include such changes. Accordingly, the scope of the invention should be determined solely by the appended claims and their legal equivalents.

All references cited herein are hereby incorporated by reference in their entireties:

[1] Carg, A. C., "Delamination—A Damage Mode in Composite Structures," *Engineering Fracture Mechanics*, 1986, Vol.29, pp.557–584.

[2] Pagano, N. J., "Interlaminar Response of Composite Materials," *Composite Materials Series*, Vol.5, Elsevier: Amsterdam, 1989.

[3] Chan, W. C., "Design Approaches for Edge Delamination Resistance in Laminated Composites," *Journal of Composite Technology and Research,* 1991, Vol.14, pp.91–96.
[4] Chan, W. S. and Ochoa, O. O., "Edge Delamination Resistance by a Critical Ply Termination," *Key Engineering Materials,* 1989, Vol.37, pp. 285–304.
[5] Masters, J. E., "Improved Impact and Delamination Resistance Through Interleafing," *Key Engineering Materials,* Vol.37, 1989, pp.317–348.
[6] Browning, C. E. and Schwartz, H. S., "Delamination Resistant Composite Concepts," *Composite Materials: Testing and Design,* J. M. Whitney, Ed., ASTM STP 893, American Society for Testing and Materials, Philadelphia, 1986, pp. 256–265.
[7] Carisson, L. A. and Pipes, R., *Experimental Characterization of Advanced Composite Materials,* Prentice-Hall, 1987, p.173.
[8] Wente, "Superfine Thermoplastic Fibers," *Industrial and Engineering Chemistry,* Vol. 42, No. 8, pp. 1342–46 (1956).
[9] Reneker et al., "Nanometer diameter fibers of polymer, produced by electrospinning," *Nanotechnology,* Vol. 7, pp. 216–23 (1996).
[10] Reneker, "Nanofibers for Engineered Textiles," *UMIST—Textiles Engineered for Performance,* Apr. 20–22, 1998.

What is claimed is:

1. A laminate comprising a plurality of stacked layers, said layers forming an interface between each pair of adjacent layers, said layers comprising a matrix material and primary reinforcing fibers, and said laminate further comprising secondary reinforcing fibers present in at least one interface, or one or more portions of said at least one interface, wherein said secondary fibers are smaller in diameter than said primary reinforcing fibers, and wherein the presence of said secondary reinforcing fibers do not substantially add to the thickness of said laminate, said secondary reinforcing fibers having a diameter less than 4000 nanometers and at least 3 nanometers.

2. The laminate according to claim 1 wherein the primary reinforcement fibers are oriented in more than one direction in the plane of the laminate.

3. The laminate according to claim 1 comprising a plurality of said interfaces reinforced by said secondary reinforcing fibers.

4. The laminate according to claim 1 wherein said matrix material is a thermosetting resin.

5. The laminate according to claim 1 wherein said matrix material is a thermoplastic resin.

6. The laminate according to claim 1 wherein said secondary reinforcement fibers comprise one or more microfibers or nanofibers selected from the group consisting of metal fibers, carbon fibers, ceramic fibers, polymer fibers, and any combination thereof.

7. The laminate according to claim 1 wherein said secondary reinforcement fibers are applied in the form of a random mat.

8. The laminate according to claim 7 wherein said random mat comprises continuous fibers.

9. The laminate according to claim 7 wherein said random mat comprises discontinuous fibers.

10. The laminate according to claim 1 wherein the secondary reinforcement fibers are applied to said at least one interface, or one or more portions of said at least one interface, by individually distributing the secondary reinforcement fibers over an area to be reinforced.

11. The laminate according to claim 10 wherein the secondary fibers are deposited from a gas or liquid suspension of said secondary reinforcement fibers.

12. The laminate according to claim 10 wherein the secondary fibers are manually distributed.

13. The laminate according to claim 1 wherein the secondary fibers comprise short fibers.

14. The laminate according to claim 1 wherein the secondary fibers comprise short carbon fibers.

15. The laminate according to claim 1 wherein the secondary fibers comprise short metal fibers.

16. The laminate according to claim 1 wherein the ratio of primary reinforcement fiber diameter to secondary reinforcement fiber diameter is about 3:1 or greater.

17. The laminate according to claim 16 wherein the ratio of primary reinforcement fiber diameter to secondary reinforcement fiber diameter is about 5:1 or greater.

18. The laminate according to claim 17 wherein the ratio of primary reinforcement fiber diameter to secondary reinforcement fiber diameter is about 10:1 or greater.

19. The laminate according to claim 18 wherein the ratio of primary reinforcement fiber diameter to secondary reinforcement fiber diameter is about 100:1 or greater.

20. A prepreg comprising a resin matrix and primary reinforcement fiber, said prepreg further comprising a secondary fiber layer apart from said primary reinforcement fiber at one or both surfaces of the prepreg, or one or more portions of said one or both surfaces of the prepreg, said secondary reinforcement fiber layer comprising fibers having a diameter smaller than said primary fiber, said secondary fiber layer including fibers having a diameter less than 4000 nanometers and at least 3 nanometers.

21. The prepreg according to claim 20 wherein said matrix material is a thermosetting resin.

22. The prepreg according to claim 20 wherein said matrix material is a thermoplastic resin.

23. The prepreg according to claim 20 wherein said secondary reinforcement fibers comprise one or more microfibers or nanofibers selected from the group consisting of metal fibers, carbon fibers, ceramic fibers, polymer fibers, and any combination thereof.

24. The prepreg according to claim 20 wherein said secondary reinforcement fibers are applied in the form of a random mat.

25. The prepreg according to claim 24 wherein said random mat comprises continuous fibers.

26. The prepreg according to claim 24 wherein said random mat comprises discontinuous fibers.

27. The prepreg according to claim 20 wherein the secondary reinforcement fibers are applied to said at least one surface, or one or more portions of said at least one surface, by individually distributing the secondary reinforcement fibers over an area to be reinforced.

28. The prepreg according to claim 27 wherein the secondary fibers are deposited from a gas or liquid suspension of said secondary reinforcement fibers.

29. The prepreg according to claim 27 wherein the secondary fibers are manually distributed.

30. The prepreg according to claim 20 wherein the ratio of primary reinforcement fiber diameter to secondary reinforcement fiber diameter is about 3:1 or greater.

31. The prepreg according to claim 30 wherein the ratio of primary reinforcement fiber diameter to secondary reinforcement fiber diameter is about 5:1 or greater.

32. The prepreg according to claim 31 wherein the ratio of primary reinforcement fiber diameter to secondary reinforcement fiber diameter is about 10:1 or greater.

33. The prepreg according to claim 32 wherein the ratio of primary reinforcement fiber diameter to secondary reinforcement fiber diameter is about 100:1 or greater.

34. A method for the manufacture of a delamination resistant reinforced laminate comprising the steps of:
   (a) providing a plurality of prepregs;
   (b) applying secondary fibers to one or more portions of at least one surface of at least one of said prepregs, wherein said secondary fibers are smaller in diameter than said primary fibers, said secondary fibers having a diameter less than 4000 nanometers and at least 3 nanometers;

(c) stacking said layers such that said secondary fibers are present in at least one interface, or portion thereof, between layers;

(d) forming the composite by consolidation of said plurality of prepregs.

35. A method for the manufacture of a delamination resistant reinforced laminate comprising the steps of:
    (a) providing a plurality of layers of primary reinforcement fibers to form at least one interface between said layers;
    (b) placing secondary fibers on one or more portions of said at least one interface between layers, wherein said secondary fibers are smaller in diameter that said primary fibers, said secondary fibers having a diameter less than 4000 nanometers and at least 3 nanometers;
    (c) applying a matrix material to said plurality of layers;
    (d) forming the composite by consolidation of the matrix material and the plurality of layers, wherein the presence of said secondary reinforcing fibers do not substantially add to the thickness of said reinforced laminate.

36. A method of making a resin prepreg, said method comprising the steps of providing an initial prepreg reinforced with primary reinforcement fiber, and applying secondary reinforcement fiber to one or more portions of at least one surface of said initial prepreg, wherein said secondary reinforcement fiber is smaller in diameter than said primary reinforcement fiber, said secondary reinforcement fiber having a diameter less than 4000 nanometers and at least 3 nanometers.

37. The prepreg according to claim 20 wherein the secondary reinforcement fibers do not substantially add to the thickness of a laminate when said prepreg is used in making a laminate.

38. A method according to claim 34 wherein said secondary reinforcement fibers do not substantially add to the thickness of said laminate.

39. A method according to claim 36 wherein said secondary reinforcement fibers do not substantially add to the thickness of said laminate when said prepreg is used in making a laminate.

40. The laminate according to claim 7 wherein said random mat comprises whiskers.

41. The prepreg according to claim 24 wherein said random mat comprises whiskers.

42. A laminate comprising a plurality of stacked layers, said layers forming an interface between each pair of adjacent layers, said layers comprising a matrix material and primary reinforcing fibers, and said laminate further comprising secondary reinforcing fibers present in at least one interface, or one or more portions of said at least one interface, wherein said secondary fibers are smaller in diameter than said primary reinforcing fibers, and wherein said secondary fibers are applied in the form of a random mat.

43. A laminate comprising a plurality of stacked layers, said layers forming an interface between each pair of adjacent layers, said layers comprising a matrix material and primary reinforcing fibers, and said laminate further comprising secondary reinforcing fibers present in at least one interface, or one or more portions of said at least one interface, wherein the ratio of primary reinforcement fiber diameter to secondary reinforcement fiber diameter is about 10:1 or greater.

44. The laminate according to claim 43 wherein the ratio of primary reinforcement fiber diameter to secondary reinforcement fiber diameter is about 100:1 or greater.

45. A laminate comprising a plurality of stacked layers, said layers forming an interface between each pair of adjacent layers, said layers comprising a matrix material and primary reinforcing fibers, and said laminate further comprising secondary reinforcing fibers present in at least one interface, or one or more portions of said at least one interface, wherein said secondary fibers are smaller in diameter that said primary reinforcing fibers, said secondary fibers having a diameter less than 4000 nanometers and at least 3 nanometers, and wherein the primary reinforcing fibers a preimpregnated with matrix material prior to forming the laminate.

46. A laminate comprising a plurality of stacked layers, each of said stacked layers having a thickness, said layers forming an interface between each pair of adjacent layers, said layers comprising a matrix material and primary reinforcing fibers embedded in said matrix material, and said laminate further comprising secondary reinforcing fibers present in at least one interface, or one of more portions of said at least one interface, wherein the presence of said secondary reinforcing fibers in said at least one interface forms a reinforced interlayer between said stacked layers, wherein said secondary fibers are smaller in diameter than said primary reinforcing fibers, said secondary fibers having a diameter less than 4000 nanometers and at least 3 nanometers, and wherein the thickness of said reinforced interlayer is about 12% or less of the thickness of said adjacent layers.

47. A laminate comprising a plurality of stacked layers, each of said stacked layers having a thickness, said layers forming an interface between each pair of adjacent layers, said layers comprising a matrix material and primary reinforcing fibers embedded in said matrix material, and said laminate further comprising secondary reinforcing fibers present in at least one interface, or one or more portions of said at least one interface, wherein said secondary reinforcing fibers are smaller in diameter than said primary reinforcing fibers, said secondary reinforcing fibers having a diameter less than 4000 nanometers and at least 3 nanometers, and wherein said laminate is manufactured without preimpregnation of the secondary reinforcing fibers with matrix material.

48. A laminate comprising a plurality of stacked layers, each of said stacked layers having a thickness, said layers forming an interface between each pair of adjacent layers, said layers comprising a matrix material and primary reinforcing fibers embedded in said matrix material, and said laminate further comprising secondary reinforcing fibers present in at least one interface, or one or more portions of said at least one interface, wherein the presence of said secondary reinforcing fibers in said at least one interface forms a reinforced interlayer between said stacked layers, wherein said secondary reinforcing fibers are smaller in diameter than said primary reinforcing fibers, said secondary reinforcing fibers having a diameter less than 4000 nanometers and at least 3 nanometers, and wherein said secondary reinforcing fibers comprise continuous fibers.

49. A method of making a resin prepreg, said method comprising the steps of preimpregnating primary reinforcement fiber with uncured or partially cured resin to produce preimpregnated primary reinforcement fiber, and applying secondary reinforcement fiber to one or more portions of at least one surface of said preimpregnated primary reinforcement fiber, wherein said secondary fiber is smaller in diameter than said primary reinforcement fiber, said secondary fiber having a diameter less than 4000 nanometers and at least 3 nanometers.

* * * * *